United States Patent [19]

Crowe

[11] 4,159,948
[45] Jul. 3, 1979

[54] BELTLESS VACUUM FILTER

[75] Inventor: William D. Crowe, San Francisco, Calif.

[73] Assignee: J. R. Schneider Co., Tiburon, Calif.

[21] Appl. No.: 882,320

[22] Filed: Mar. 1, 1978

Related U.S. Application Data

[63] Continuation-in-part of Ser. No. 779,715, Mar. 21, 1977, abandoned.

[51] Int. Cl.² ............................................. B01D 33/04
[52] U.S. Cl. .................................... 210/111; 210/138; 210/196; 210/400
[58] Field of Search ............... 210/111, 160, 196, 400, 210/401, 138; 209/307; 162/348

[56] References Cited

U.S. PATENT DOCUMENTS

| | | | |
|---|---|---|---|
| 3,083,831 | 4/1963 | Fowler | 210/111 |
| 3,091,336 | 5/1963 | Hirs | 210/111 |
| 3,121,681 | 2/1964 | Baxter | 210/400 X |
| 3,506,128 | 4/1970 | Pashaian et al. | 210/387 X |
| 3,939,077 | 2/1976 | Seibert | 210/401 |
| 4,037,338 | 7/1977 | Berline | 210/401 X |
| 4,071,451 | 1/1978 | Wood | 210/111 X |

*Primary Examiner*—William A. Cuchlinski, Jr.
*Attorney, Agent, or Firm*—Owen, Wickersham & Erickson

[57] ABSTRACT

A liquid filter apparatus wherein an elongated sheet of filter media is movable along an inclined support at the bottom of a receiving tank for dirty liquid below which is a collection tank for filtered liquid. The periphery of the collection tank is sealed by clean liquid supplied from an auxiliary reservoir at a pressure greater than the liquid in the receiving tank. A suction pump attached to the outlet from the collection tank helps to maintain flow of clean liquid through the media while filtered out material is accumulated on its upper surface. Fresh filter media is pulled into position from a supply roll to replace loaded filter media by drive means controlled to operate automatically after the pressure in the collection tank is substantially equalized temporarily with that in the receiving tank.

21 Claims, 10 Drawing Figures

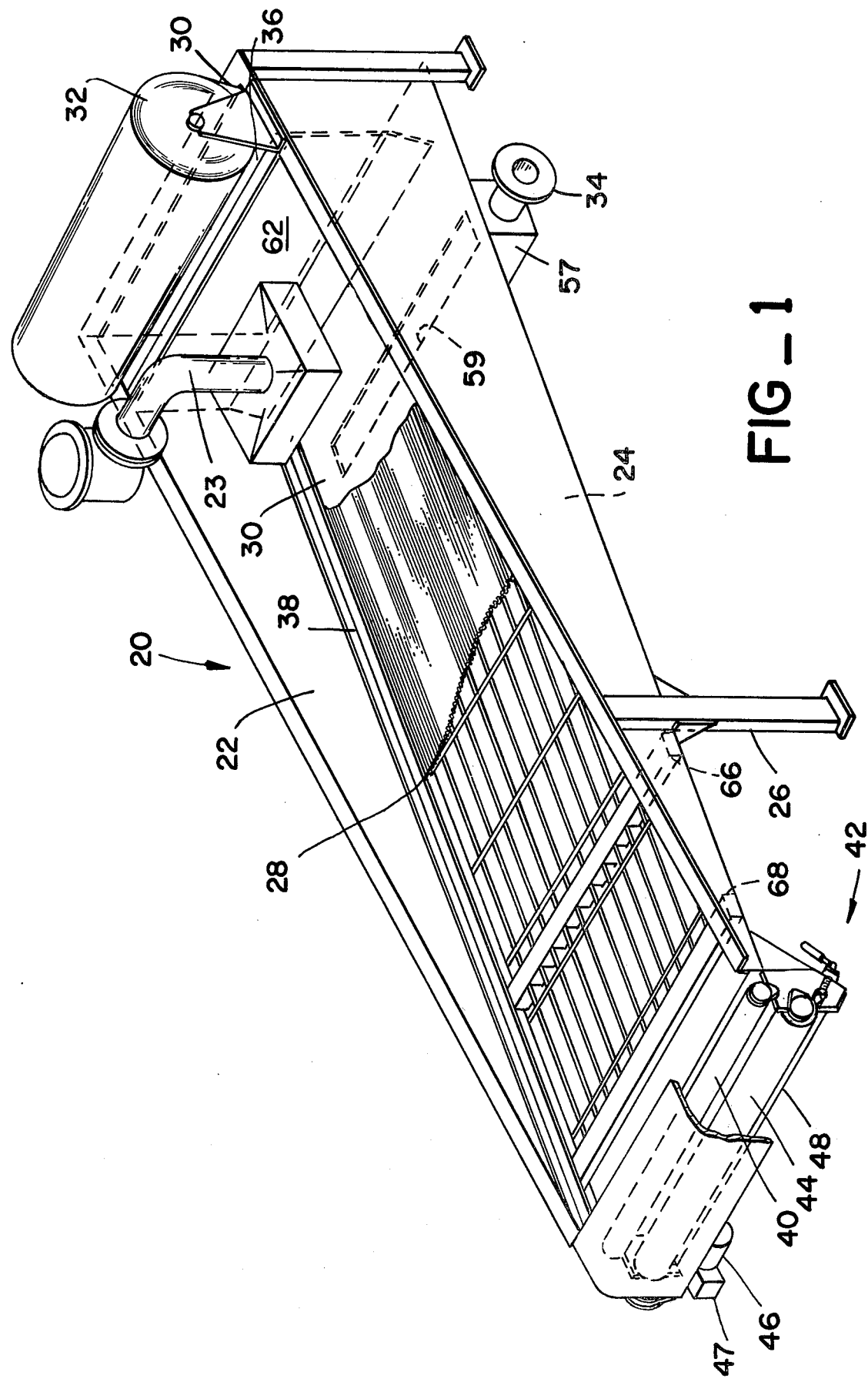

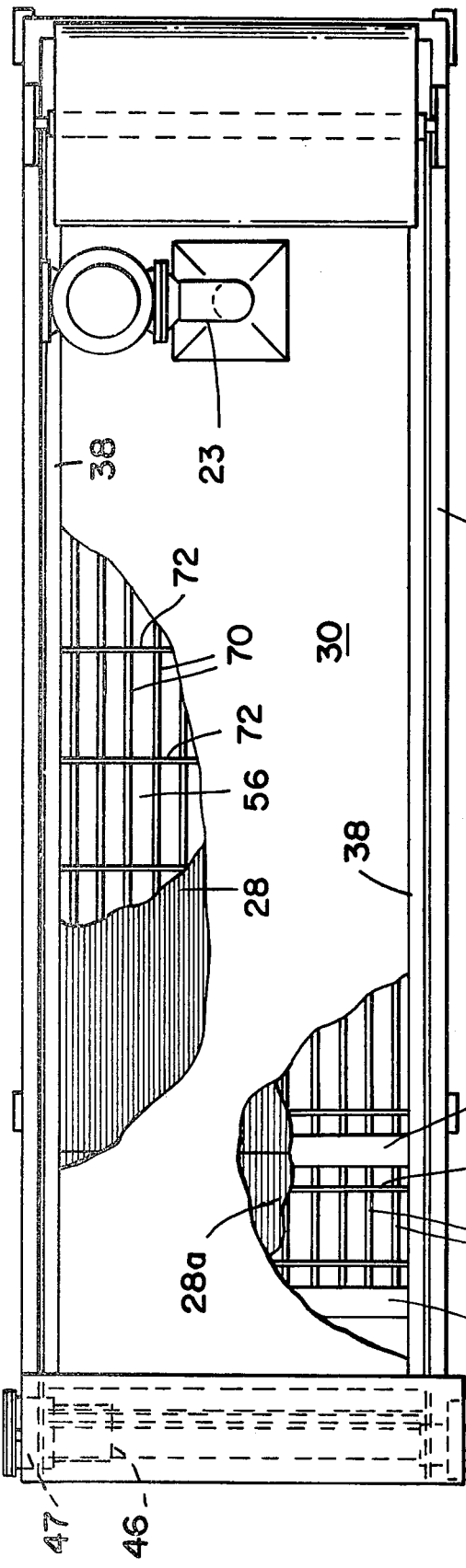
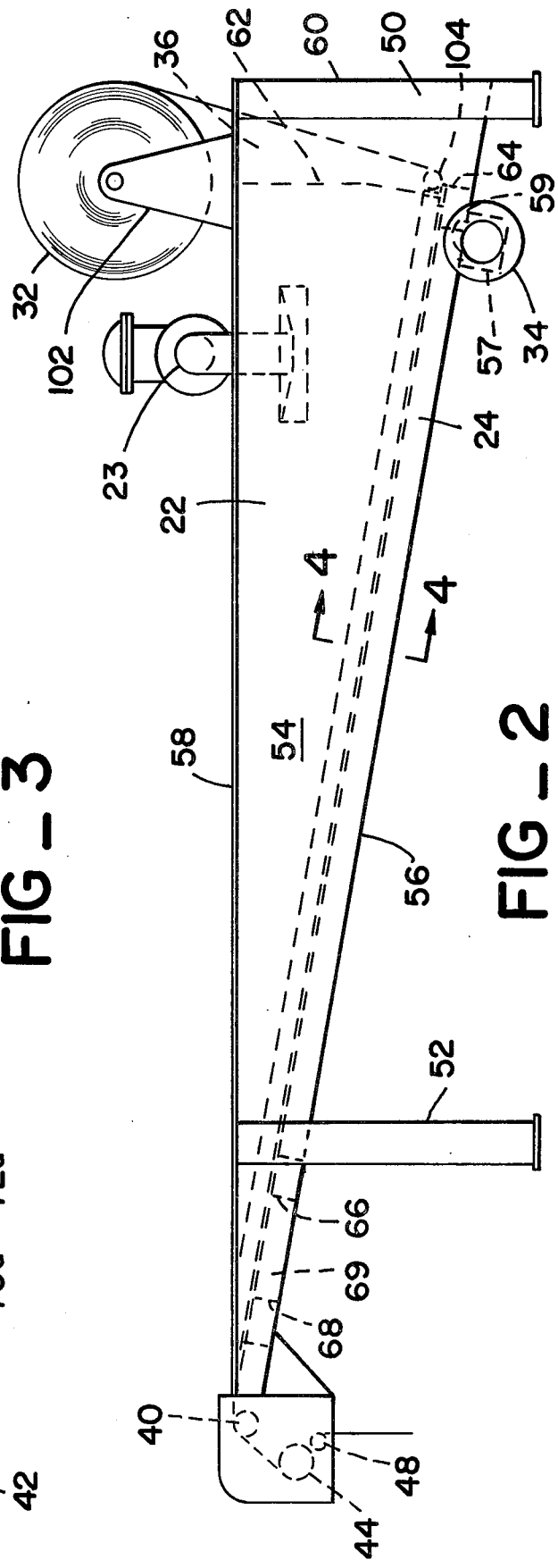

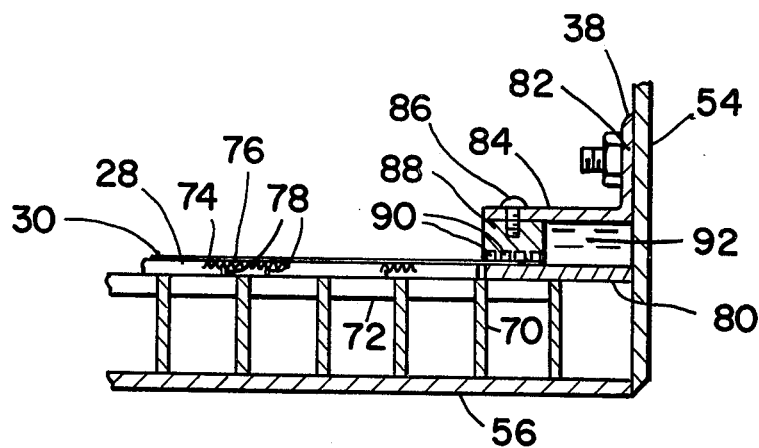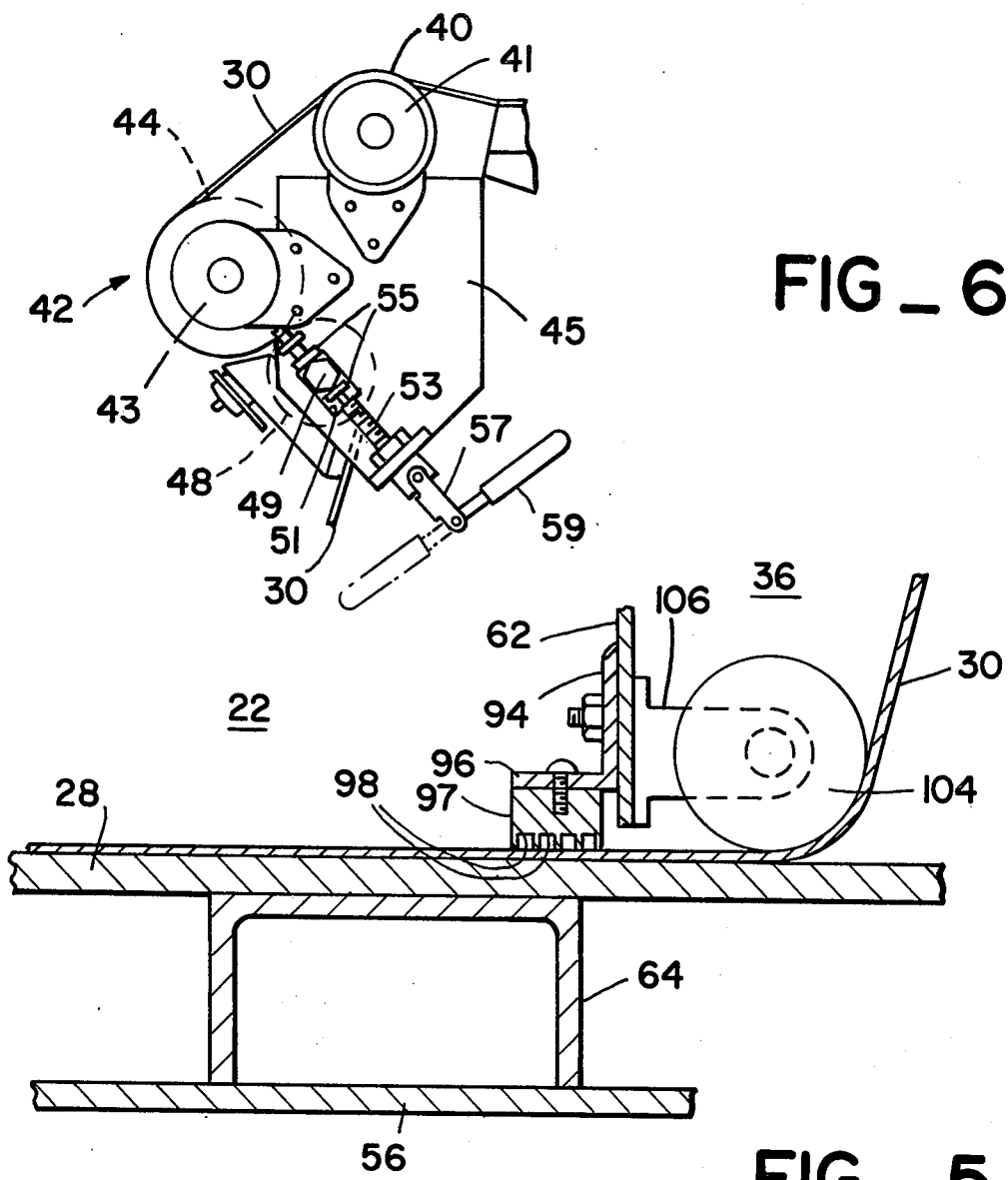

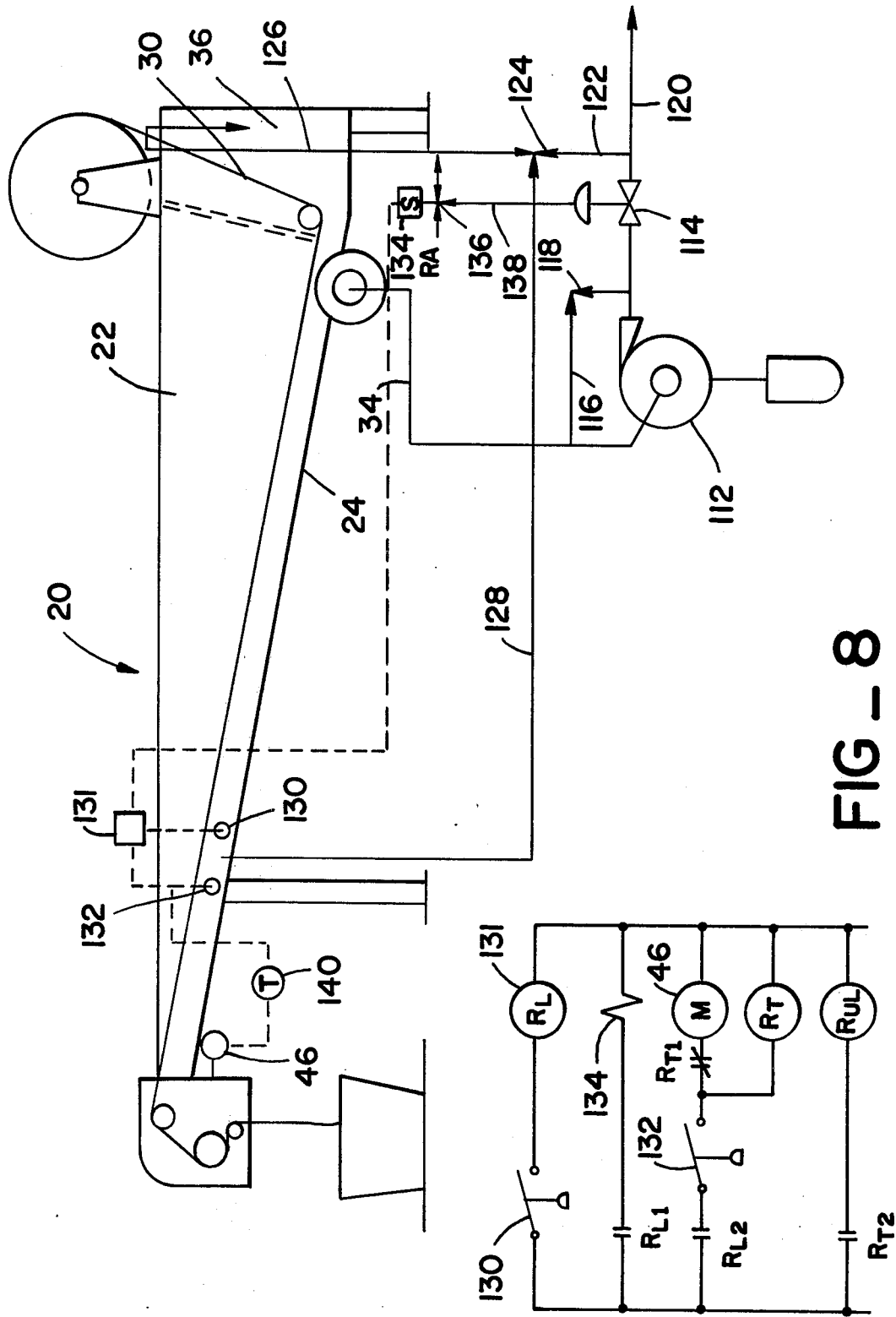

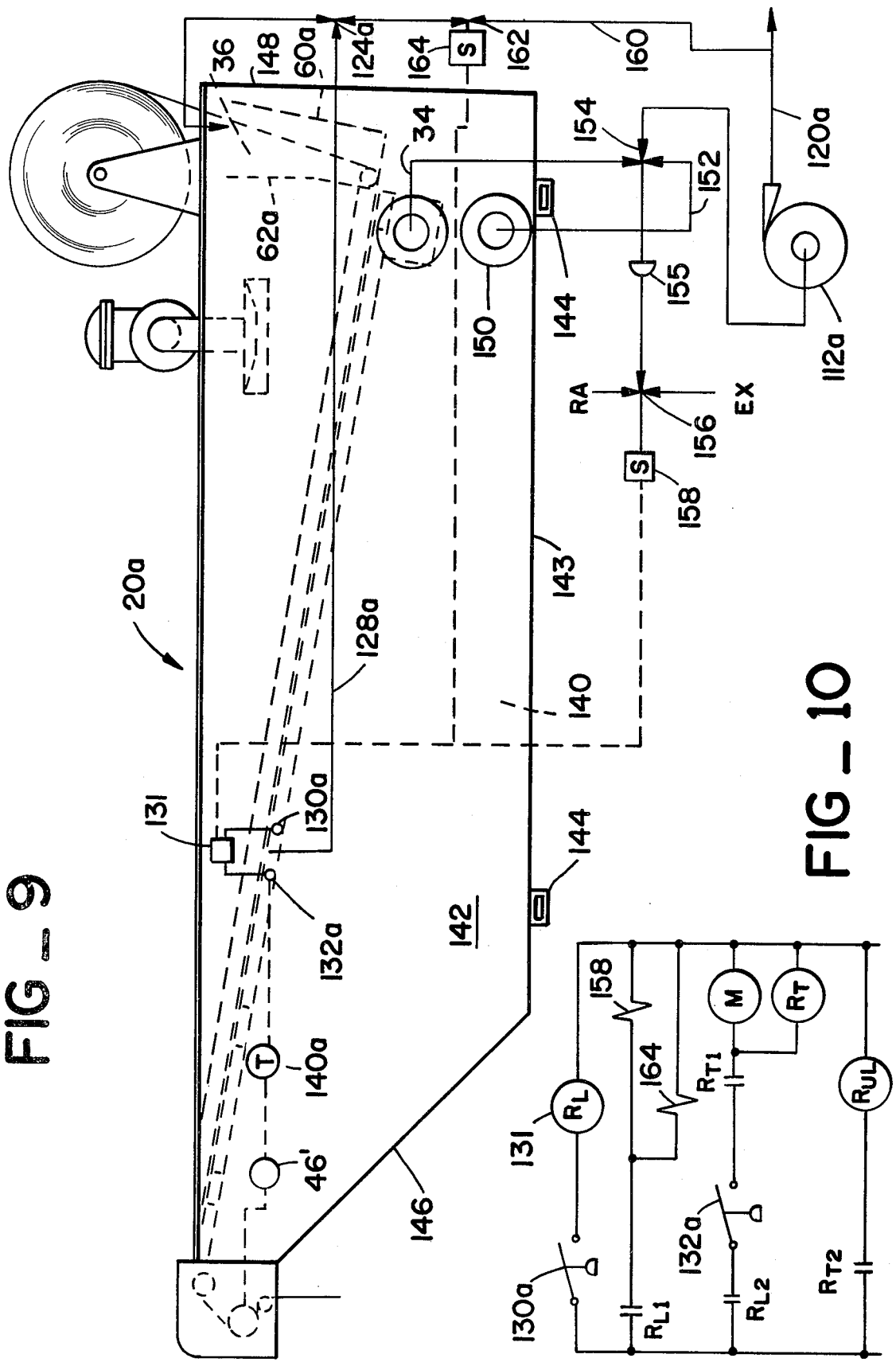

BELTLESS VACUUM FILTER

This is a continuation-in-part of my co-pending application Ser. No. 779,715 filed Mar. 21, 1977 now abandoned.

This invention relates to filter apparatus utilizing a movable continuous filter media for filtering relatively large volumes of liquid used for or in conjunction with various industrial processes.

BACKGROUND OF THE INVENTION

In my above noted parent co-pending application, a filter apparatus is disclosed wherein an inclined movable belt or conveyor is utilized to support a continuous strip of filter media. For certain filtering applications it may be desirable to provide an apparatus that utilizes a movable continuous strip of filter media which does not require a belt or conveyor to support the media. In such an apparatus the media from a suitable supply roll is supported on a fixed structure and pulled by a suitable means capable of gripping the front or free end of the media. The filter media forms the bottom of a receiving tank for dirty liquid to be filtered and directly below it is a collection tank for clean liquid. A suction pump attached to an outlet from the collection tank creates a reduced pressure in the collection tank which increases the flow of liquid from the receiving tank through the media. When the suction pump is in operation, the reduced pressure created thereby in the collection tank causes the filter media to cling tightly to its supporting grill and in this position the media continues to trap more and more filtrate on its upper surface. As filtered out material from the dirty liquid continues to build up on the filter media the pressure in the collection tank becomes progressively less, as well as the flow of liquid through the media. It thus becomes necessary to advance the media to provide fresh, unloaded filter media. However, in an apparatus with no belt or conveyor, movement of the loaded media becomes difficult, if not impossible, if the pressure differential between the receiving and collection tanks is relatively high, that is, if the pressure in the collection tank remains substantially lower from that in the receiving tank. Thus, it became essential to provide a solution to this problem of equalizing the pressure in the receiving and collection tanks just prior to movement of the filter media.

BRIEF SUMMARY OF THE INVENTION

The aforesaid and other problems are solved by a filter apparatus according to the present invention comprised of a frame and wall structure that forms a receiving tank for dirty liquid to be filtered and a collection tank under the receiving tank for the clean filtered liquid. A suction pump attached to an outlet from the collection tank produces a reduced pressure therein to help increase flow of filtered liquid through a strip of filter media located between the receiving tank and collection tank. The filter media is supported on an inclined grid within the apparatus between the receiving and collection tanks and retained within side sealing guides. The side and rear edges of the collection tank are sealed by the filter media and by clean liquid constantly supplied from a reservoir at a pressure greater than that of the dirty liquid in the receiving tank. At the forward end of the apparatus the filter media is engaged by a pulling device as it leaves the upper end of the inclined grid. The pulling device for advancing the filter media is activated by a control system that includes a pressure operated outlet valve connected to the outlet of the suction pump. The outlet of this valve is connected to the main conduit to the process using the clean filtered liquid, but it is also connected to a branch line to an eductor which is connected to conduits extending to the supply reservoir for the clean sealing liquid and also to a pair of vacuum switches in the collection tank. When the filter media commences to get clogged and the pressure in the collection tank falls below a predetermined level, the outlet valve is closed by a first vacuum switch. This reduces the liquid pressure normally supplied to the eductor and consequently the flow in the eductor is reversed. This breaks the near vacuum in the collection tank which actuates the second vacuum switch, thereby closing a circuit to the drive motor and activating the media puller. With the vacuum in the collection tank broken, the forces on the media are more equal and friction is reduced so that the media can be readily moved. The puller is deactivated on a preset time delay after a predetermined amount of fresh media has been moved into position. With the pressure in the collection tank now well above the vacuum level the outlet valve is opened and normal operation is resumed. The control system will keep cycling in the aforesaid manner without any manual manipulation as long as a supply of filter media is available.

It is therefore a general object of the present invention to provide an improved filter of the type utilizing a movable strip of filter media, wherein the media itself is moved without being supported by a movable belt or conveyor.

Another object of the present invention is to provide a filter apparatus of the type wherein a strip of filter media located between a receiving tank for dirty liquid and a collection tank for the clean, filtered liquid is movable by a pulling force controlled automatically in response to the relative load of filtered out material on the media as reflected by the pressure in the collection tank.

Another object of the present invention is to provide a filter apparatus of the type described utilizing a strip of filter media (not supported by a movable belt or conveyor) which, when loaded with filtered out material, is advanced automatically with a minimum of tension stress and in a minimum time period to expose fresh media.

Another object of the present invention is to provide a filter apparatus of the type described wherein sealing of the periphery of the collection tank is accomplished in part by clean liquid provided at a pressure greater than that of the dirty liquid in the receiving tank.

Another object of the present invention is to provide a filter apparatus of the type described which can be easily operated and maintained by relatively unskilled labor.

Another object of the present invention is to provide a filter apparatus of the type described which can be provided in one form to utilize its own storage for clean filtered liquid on which can be readily connected to auxiliary storage tanks.

Other objects, advantages and features of the invention will become readily apparent from the following detailed description of one embodiment which is presented in conjunction with the accompanying drawing.

BRIEF DESCRIPTION OF THE DRAWING

FIG. 1 is a view in perspective of a filter apparatus embodying principles of the present invention with portions broken away to show structural details;

FIG. 2 is a view in side elevation of the filter apparatus of FIG. 1;

FIG. 3 is a top view of the filter apparatus of FIG. 1 with portions broken away;

FIG. 4 is an enlarged fragmentary view in section taken along the line 4—4 of FIG. 2;

FIG. 5 is an enlarged fragmentary view in section showing the intermediate rear wall and its sealing member;

FIG. 6 is an enlarged view in side elevation showing the filter media puller in greater detail;

FIG. 7 is a partially schematic view in side elevation showing the control system for the filter apparatus of FIG. 1;

FIG. 8 is a diagram for illustrating the operation of the control system for the filter apparatus of FIG. 7; and FIG. 9 is a view in side elevation of a modified form of filter apparatus according to the invention including its control system shown schematically; and FIG. 10 is a diagram for illustrating the sequential operation of the control system for the filter apparatus of FIG. 9.

DETAILED DESCRIPTION OF EMBODIMENTS

Referring to the drawing, FIG. 1 shows a filter apparatus 20 which according to the invention, comprises generally a received tank 22 for dirty liquid to be filtered, located above a collection tank 24 for clean, filtered liquid, both tanks being supported by a suitable frame 26. The dirty liquid is furnished to the receiving tank through an inlet pipe 23 preferably having an end deflector. Separating these two tanks and forming the bottom of the receiving tank is an inclined perforated grill plate 28 which supports a layer or strip of filter media 30 fed from a supply roll 32. The collection tank under the inclined grill plate has an outlet conduit 34 connected to a suction pump (not shown in FIG. 1), and its periphery is sealed from the receiving tank. This enables reduced pressure to be maintained in the collection tank which induces greater flow through the filter media and the supporting grill plate. The aforesaid sealing is accomplished in part by clean liquid supplied from a storage reservoir 36 to elongated fluid passage or chambers formed by sealing members 38 along the side edges of the filter media. The entire sealing arrangement will be described in greater detail later on.

Attached to the front end of the filter apparatus 20, adjacent the upper end of the inclined grill plate is a guide or spreader roller 40 over which the media passes. Below this roller the media is engaged by a puller device 42 for applying tension to the media to advance it along the inclined grill plate. The puller device comprises a crown roller 44 driven by an axially connected motor 46 through a reducing gear box 47 and a pinch roller 48. The media from the spreader roller passes over and partially around the crown roller and between it and the pinch roller.

The drive motor is activated by a control system to be described later which functions to turn the crown roller and thereby advance the media so that fresh media can be moved into place between the receiving and collection tanks. The used media, loaded with filtered out material, is dispensed downwardly from the puller device into a suitable container for disposal.

As shown in FIGS. 2-3, wherein the apparatus 20 is described in greater detail, the frame 26 is comprised of a pair of spaced apart upright members 50 and similar forward upright members 52, all of which may be formed from rigid structural metal material such as elongated channel shaped stock.

Attached to these frame members is a sheet metal body member having vertical and triangular shaped side walls 54 interconnected by a sloping bottom member 56.

In the embodiment of FIGS. 1 to 8, the outlet conduit 34 from the collection tank is located at the end of a trough-like collector member 57 fixed to and extending transversely across the underside of the bottom member 56 near its lowest point. A transverse slot 59 is provided in the bottom member just above the collector member so that the filtered liquid flowing through the media is gravity fed into it.

The side walls have a horizontal top edge with an outwardly extending strengthening flange 58 and they taper from a maximum height at the rear or deep end to a much smaller height at the forward end. A rear wall member 60 encloses the rear end. Spaced inwardly from the rear wall member is an intermediate wall member 62 that extends between side walls and forms the storage reservoir 36 for clean liquid used in sealing the collection tank. Extending between the side walls and supported on the bottom member are three cross frame members 64, 66 and 68. A rear cross frame member 64 forming the rear wall of the collection tank is located under the edge of the intermediate wall member 62 and a forward cross member 68 extends between the side walls at their narrow front ends. An intermediate cross member 66 spaced from the forward cross member approximately between the front upright frame members forms the front end wall of the collection tank 24. The space between the forward and intermediate cross members provide a drying chamber for the filter media, designated by numeral 69.

Supported on the edge by the sloping bottom member 56 between the rear and intermediate cross members and extending longitudinally thereon are a series of steel strips 70 which are spaced apart but connected together by a series of rods 72 to form a grate. This grate within the collection or "vacuum" tank supports the sloping grill plate 28. This plate is preferably formed from a strong durable and relatively rigid sheet material such as aluminum provided with alternating ridges 74 and grooves 76 on its upper surface. (See FIG. 4). The ridges minimize contact area with the filter media 30 thereon, and spaced apart within the adjacent grooves are a multiplicity of drilled or punched holes 78. A relatively short piece 28a of grill plate providing a cover for the drying chamber extends between the forward and intermediate cross members 66 and 68 and is supported on a similarly short piece of grate comprised of steel strips 70a and metal rods 72a.

Fixed to each side wall 54, as shown in FIG. 4 is a flat side plate 80 whose upper surface is perpendicular to the side wall and co-planar with the tops of the ridges 74 on the grill plate 28. Spaced above each side plate is a guide member 38 in the form of a right angle structural member whose vertical leg 82 is attached to the side wall. The horizontal leg 84 of each side sealing member is parallel to the side plate 80 spaced below, and fixed to its underside near its outer end, as by a series of machine screws 86 is an elongated sealing strip 88. The bottom face of this latter strip is spaced just above the side plate so that there is enough clearance to allow the edge of the filter media to move freely without excessive friction. A series of elongated grooves 90 are provided in the bottom face of each strip 88 which form a labyrinth for clean sealing liquid. Thus, the area bordered by the sealing strip 88, the side wall 54, the sealing member 82 and the side plate 80 forms the cross section of a side chamber 92 which communicates with the reservoir 36 for clean sealing liquid. Since the reservoir is kept at a level higher than that of the receiving tank, the liquid pressure within these side chambers 92 is greater. Thus, clean liquid constantly fills the labyrinth grooves 90 of the sealing strips and prevents any migration of dirty liquid from the receiving tank around the side edges of the filter media.

Fixed to the bottom of the intermediate wall 62, as shown in FIG. 5, is a rear cross sealing member 94 also having a right angle cross section. The vertical leg of this sealing member is fixed to the wall member whose lower edge is positioned just above the surface of the filter media as it enters into the receiving tank. Attached to the underside of the horizontal leg 96 of the cross sealing member 94 is a sealing strip 97 having a series of longitudinal grooves 98 on its bottom surface which function similar to those on the side sealing strips 88. Thus, clean liquid from the reservoir 36 is present under the intermediate wall member and fills the grooves 98 to prevent any rearward migration of dirty liquid into the clean reservoir.

The filter media 30 used with the apparatus 20 may be of any suitable type such as a commercially available paper type media having a thickness in the range of 0.005–0.062 inches. The supply roll 32 of media is mounted on a shaft which is journaled in bearings 102 fixed at some convenient location on the frame or, as shown, to the top edges of the receiving tank. The sheet of media from the supply roll extends downwardly into the clean liquid reservoir 36, around a guide roller 104 and under the intermediate wall 62 and its grooved sealing member 94. The guide roller 104 is supported at its ends by a pair of bearings 106 fixed to the intermediate wall 62.

As shown in FIG. 6, the ends of the spreader roller shaft are supported in a pair of bearings 41 and the ends of the crown roller shaft are supported in a pair of bearings 43. The latter bearings are fixed to mounting plates 45 spaced apart and attached to the forward end of the apparatus. The pinch roller 48 which has an outer layer of resilient material, is urged against the crown roller 44 by an adjustable mechanism attached to each mounting plate. The crown roller is preferably knurled on its outer surface to provide a better grip on the paper. Each end of an axial shaft 49 for the pinch roller extends through an opening 51 in one mounting plate 45. Projecting transversely through each shaft end is a threaded pin 53. A pair of collars 55 which are adjustable on this pin, are used to bear against the opposite sides of the shaft 49 and thereby hold it in a preselected position. By movement of these collars on the pin 53 the pinch roller can be positioned tightly against the crown roller with the paper between these two rollers. The pin is also connected to a toggle linkage 57 controllable by a handle 59 so that when the paper is initially threaded, the pinch roller can be quickly moved away from the crown roller by an amount sufficient to provide adequate clearance for the paper. When the handle is moved back, the pinch roller will return to its preadjusted position against the paper and the crown roller.

The control system for the filter apparatus 20 is best described with reference to FIG. 7. As shown, the outlet conduit 34 from the collection tank 24 is connected to the inlet side of a suction pump 112. The outlet from this pump is connected to an outlet valve 114. A recirculating feedback conduit 116 containing a relief valve 118 is provided between the pump and the outlet valve. An outlet conduit 120 from the outlet valve furnishes clean filtered liquid to the processing machinery using it or to a storage facility. Branching from this outlet conduit 120 is a conduit 122 connected to one side of the convergent-divergent passage of an eductor 124. The other side of this eductor passage is connected to a conduit 126 that extends into the reservoir 36 for clean liquid in the apparatus. A small conduit 128 extends from the eductor 124 to the forward end of the collection tank where entrained air that is liberated from the filtered liquid is more likely to accumulate. As will become apparent, the eductor 124 has essentially three functions. First it removes from the collection tank the liberated air which, if not eliminated, would cause the pump 112 to lose its prime. Second, it supplies clean fluid to the reservoir 36, and third, it functions to break the vacuum in the collection tank so that the paper can be easily advanced.

Installed in this same forward end location within the collection tank where the air accumulates is a pair of pressure switches 130 and 132. The first pressure switch 130 is connected electrically to a solenoid 134 for operating an air valve 136 located near the outlet valve. This latter air valve, supplied with air from a regulated pressure source (RA), has an exhaust port and an outlet 138 connected to the diaphragm of the outlet valve 114.

The first pressure switch is also connected electrically to the second pressure switch which, in turn, is connected through a timing relay 140 to the motor 46 that drives the media puller device 42.

The operation of the filter apparatus 20 may be readily understood by reference to FIGS. 7 and 8. As dirty liquid is supplied to the receiving tank 22, the suction pump 112 operates to provide a reduced pressure in the collection tank 24 so that filtration takes place and the flow of clean liquid through the filter media 30 is maintained at the maximum level. Clean liquid from the outlet valve 114 is furnished through the outlet conduit 120 to the using process and also through the eductor 124 and into the reservoir 36. As filtered-out material builds up on the filter media within the receiving tank the pressure in the collection tank will fall until it reaches a predetermined level (e.g. 5 psi absolute or −10 psi gage pressure). At this point the first pressure switch 130 is activated and pulls in a latching relay $R_L$ which, as indicated in the diagram of FIG. 8: (1) closes a first pair of contacts $R_{L1}$ to activate the solenoid 134 and thus its valve 136, which closes the outlet valve 114; and (2) close a second pair of contacts $R_{L2}$ to supply power to the second pressure switch 132. The pump 112 continues to operate and with the outlet valve closed, the pump outlet pressure opens the relief valve 118 in the feedback conduit 116 to allow recirculation through the pump.

Now, with the outlet valve closed and the pump recirculating liquid through the conduit 116 and the relief valve, no liquid is flowing through the conduit 122 and the eductor 124 into the reservoir. In fact, the flow reverses in the eductor and by a siphoning action liquid flows from the reservoir 36 through the conduit 128 back to the collection tank. This immediately raises the pressure or breaks the near vacuum in the collection tank which has the effect of removing the main friction or drag force on the sides of the filter media strip 30.

As mentioned above, when the low pressure level was reached and the first pressure switch 130 was activated it also supplied power to the second pressure switch 132 through the latching relay contacts $R_{L2}$ switch. The second pressure switch is set to be activated at substantially the same pressure level as in the dirty liquid tank 24. Therefore, when the reverse flow in conduit 128 eliminates the near vacuum or suction condition in the collection tank the pressure therein rises to the normal level, and the second pressure switch 132, as indicated in FIG. 8, supplies power through the normally closed contacts $R_{T1}$ of the timing relay 140 to the media puller drive motor 46. Since the vacuum has been eliminated in the collection tank the frictional drag on the media is also reduced to the level where the media can be pulled easily by the puller 42. The timing relay causes the motor to operate for a period of time (e.g. 3 to 5 seconds) that is long enough for it to advance the media by a length sufficient to remove all the used media and replace it with fresh media. At the end of this time period, the normally closed contacts $R_{T1}$ are opened to stop the motor. When this has taken place, a pair of auxiliary contacts $R_{T2}$ on the timing relay close to supply power to an unlatching coil $R_{UL}$ of the latching relay, thereby restoring all circuits to the filtering mode.

In the form of my invention just described the collection tank 24 is relatively small and it is intended that in an industrial system using the filter 20 auxiliary storage tanks for clean liquid would be utilized to assure ample flow of clean liquid during the brief down time period when the filter media is being changed.

A modified form of the present invention is shown in FIG. 9 wherein a filter apparatus 20a is provided with its own storage tank 140 for clean liquid. This storage tank is located generally under the collection tank 24 and is formed by downward extensions 142 of the side walls 54 which extend below the bottom member 56. The upright frame members of the first embodiment may be eliminated unless side wall stiffening is required and a bottom member 143 of the storage tank may be supported on transverse supports 144. A forward wall 146 and an extended rear wall 148 connected to the side wall extensions 142 complete the storage enclosure. The extended rear wall 148 is spaced rearwardly from the original rear wall which thus becomes a weir 60a for the clean liquid reservoir 36, having a top edge that is slightly lower than that of the intermediate wall member 62a.

The storage reservoir 140 is provided with its own outlet 150. In this embodiment, the outlet conduit 34 from the collection tank 24 and an outlet conduit 152 from the reservoir outlet 150 are both connected to a three-way valve 154. The outlet from this latter valve is connected to a suction pump 112a, whose outlet furnishes clean liquid to the using machines through a conduit 120a. The diaphragm 155 for controlling this outlet valve is connected to an air valve 156 having an air pressure inlet port supplied from a regulated air source (RA), an exhaust port (Ex) and controlled by a solenoid 158.

As in the previous embodiment, a branch conduit 160 from the pump outlet conduit 120a extends through an eductor 124a to the clean liquid reservoir 36. In this conduit 160, between the pump outlet conduit and the eductor is a shut-off valve 162 controlled by a second solenoid 164. As in the first embodiment, a conduit 128a extends from the eductor 124a to the forward end of the collection tank.

Also, as provided in the first embodiment, first and second pressure switches 130a and 132a are provided within the collection tank. The first switch 130a is connected electrically through a latching relay 131 to the second switch 132a. It is also connected to the first solenoid 164 for the eductor control valve 162, and to the second solenoid 158 for the 3-way valve 156. The second pressure switch 132a is connected through a timing relay 140a to the drive motor 46 for the filter media puller 42.

Operation of the filter 20a, as illustrated diagrammatically in FIG. 10, is similar to that of the filter 20 and as shown in FIG. 8 except for the use of liquid from the additional storage reservoir 140. This reservoir is initially filled by virtue of the fact that the weir 60a between the reservoir 36 and the storage tank 140 is lower than the intermediate wall 62a between the receiving tank and the reservoir 36. Thus, surplus clean fluid passing through the eductor and into the reservoir 36, flows over the weir into the storage tank until it is filled, and thereafter it flows into the receiving tank.

Now, when the filter media becomes loaded with filtered out material, the pressure within the collection tank continues to drop until it reaches a predetermined level (e.g. 5 psi absolute or about 10 psi below atmospheric pressure). At this point the first pressure switch 130a is activated to close the latching relay 131 which (1) furnishes power to the second pressure switch 132a; (2) activates the first solenoid 164 to close the valve 162 in the branch conduit to the eductor 124a; and (3) activates the second solenoid 158 to actuate the 3-way valve 156 that causes the pump to draw clean liquid from the storage tank instead of the collection tank.

As with the filter 20, the flow in the eductor is now reversed due to closure of the valve 162 and, as in the previous embodiment, fluid flows in conduit 128a from the reservoir to the collection tank to eliminate the negative pressure condition. When the pressure in the collection tank reaches atmospheric (i.e. 14.7 psi), the second pressure switch 132a is actuated to furnish power through the timing relay 140a to the drive motor 46. The motor then runs for the time period necessary (as preset by the timing relay) to advance the required amount of fresh filter media.

The normal maximum time elapsed for a media advancing cycle as described is around 15 seconds. Since the storage tank can hold a supply of clean liquid which will last, under normal demand, for around 15 to 20 minutes, there is an ample supply in the storage reservoir to assure continuous service from the filter.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A filter apparatus comprising:
 wall means including spaced apart side walls forming a receiving tank for dirty liquid to be filtered, a collection tank below said receiving tank for clean filtered liquid and an auxiliary reservoir for clean liquid adjacent said receiving tank;

a fixed inclined pervious means for supporting a layer of movable filter media forming the bottom of said receiving tank;

means for supplying an elongated sheet of filter media to the upper side of said pervious means;

means for sealing the periphery of said collection tank to prevent dirty liquid from migrating from said receiving tank around the side edge of the filter media into said collection tank;

means at the forward end of said apparatus for pulling the filter media over said pervious means;

a suction pump attached to an outlet from said collection tank for reducing pressure therein during the operation of said apparatus to increase the flow of liquid through said filter media;

means responsive to a predetermined low pressure level within said collection tank due to accumulation of filtered out material on said filter media for temporarily substantially equalizing the pressure in said collection and receiving tanks and thereafter for automatically controlling said media pulling means to move said media up said inclined pervious support means.

2. The filter apparatus as described in claim 1 wherein said wall means includes a rear wall member interconnecting said side walls, an intermediate wall member spaced inwardly from said rear wall to form a barrier between said receiving tank and said reservoir and a sloping bottom wall between said side walls.

3. The filter apparatus as described in claim 2 wherein said side wall means extend below said bottom wall to form an additional storage tank for clean filtered liquid.

4. The filter apparatus as described in claim 2 wherein said sloping bottom wall has a transverse recess near its lower end which communicates with an outlet in one said side wall connected to said suction pump.

5. The filter apparatus as described in claim 1 wherein said pervious support means comprises an elongated rigid sheet having a upper surface formed by parallel alternating ridges and grooves with holes through said sheet spaced apart within said grooves.

6. The filter apparatus as described in claim 5 wherein said sheet is supported on a series of parallel, spaced apart metal strip members arranged on edge and interconnected to form a grate under said sheet.

7. The filter apparatus as described in claim 1 wherein said sealing means comprises sloping, elongated members on the inside of each side wall above and parallel to said inclined support means and forming elongated chambers communicating with said reservoir of clean liquid and adjacent the edges of the filter media.

8. The filter apparatus as described in claim 7 wherein each said elongated member has a right angle cross section including an upright leg fixed to said side wall and a horizontal leg extending over the edge of said support member and provided with a sealing strip fixed to its outer end having a bottom surface with series of grooves adapted to be close to the surface of the filter media and supplied with clean liquid from the adjacent elongated chamber.

9. The filter apparatus as described in claim 1 wherein said means for controlling said media pulling means comprises a main conduit from the outlet of said suction pump for clean, filtered liquid; a branching circuit from said main conduit to said reservoir; an eductor in said branching conduit; controllable cutoff valve means between said eductor and said suction pump; a secondary conduit extending from said eductor to said collection tank; pressure switch means in said collection tank; means connected to said pressure switch means for operating said valve means; and means connected to said pressure switch means for operating said media pulling means; whereby when said filter media becomes loaded so as to cause the pressure within said collection tank to fall below a preset level, said pressure switch means operates to close said outlet valve and thereby cause a reverse flow in said secondary conduit between said reservoir and said collection tank which eliminates a low pressure condition in said collection tank and thereafter activate said media pulling means to advance said media.

10. The filter apparatus as described in claim 9 wherein said switch means comprises a first pressure switch connected to said valve means that controls the flow of liquid to said eductor, and a second pressure switch connected to said first pressure switch and to said media pulling means, said first pressure switch being preset to operate when pressure in the collection tank is at some preselected level below atmospheric pressure and said second pressure switch being preset to operate after said first pressure switch when the pressure in said collection tank has returned to substantially atmospheric pressure.

11. The filter apparatus as described in claim 10 including a timing relay connected to said second switch and said media pulling means for causing said latter means to advance a predetermined length of filter media before shutting off.

12. The filter apparatus as described in claim 11 wherein said media pulling means comprises a crown roller and a pinch roller urged against said crown roller, and motor means for driving said crown roller and connected to said second switch.

13. The filter apparatus as described in claim 10 including a storage tank located below said collection tank and extending to an internal wall adjacent said reservoir so as to be filled by the overflow from said reservoir, said storage tank having its own outlet.

14. The filter apparatus as described in claim 13 including an interconnecting conduit between said outlet from said storage tank and said outlet from said collection tank, a three-way valve in said interconnecting conduit connection to said suction pump, and control means for switching said three-way valve so that liquid can be removed from either said collection tank or said storage tank.

15. The filter apparatus as described in claim 14 wherein said latter control means is said first pressure switch.

16. A filter apparatus comprising:
wall means including spaced apart side walls forming a receiving tank for dirty liquid to be filtered, a collection tank below said receiving tank for clean filtered liquid and an auxiliary reservoir for clean liquid adjacent said receiving tank;

fixed inclined pervious means between said side walls for supporting a layer of movable filter media forming the bottom of said receiving tank;

means for supplying an elongated sheet of filter media to the upper side of said pervious means;

means for sealing the periphery of said collection tank to prevent dirty liquid from migrating from said receiving tank around the side edge of the filter media into said collection tank;

means at the forward end of said apparatus for pulling the filter media over said pervious means;

a suction pump attached to an outlet from said collection tank for reducing pessure therein during the operation of said apparatus to increase the flow of liquid through said filter media;

first means responsive to a predetermined reduced pressure level within said collection tank due to accumulation of filtered out material on said filter media for temporarily substantially equalizing the pressure in said collection and receiving tanks;

second means response to said substantially equalized pressure and for automatically controlling said media pulling means to move a predetermined length of said media up said inclined pervious support means and thereafter for commencing normal operation of said apparatus.

17. The filter apparatus as described in claim 16 wherein said suction pump has an outlet conduit for clean liquid;

a branch conduit extending from said outlet conduit through an eductor means to said auxiliary reservoir;

a secondary conduit extending from said eductor means to said collection tank;

said first means including eductor valve means in said branch conduit responsive to a reduced pressure level in said pump outlet conduit to said auxiliary reservoir and thereby causing a reverse flow of liquid in said secondary conduit that increases the pressure in said collection tank.

18. The filter apparatus as described in claim 17 wherein said first means further includes a first pressure switch in said collection tank adapted to operate at a preselected reduced pressure level to close said eductor valve means; and said second means including a second pressure switch in said collection tank adapted to operate said media pulling means when the pressure in said collection tank has become substantially equal to the pressure in said receiving tank.

19. The filter apparatus as described in claim 18 including a latching relay activated by said first pressure switch for closing said eductor valve and supplying power to said second pressure switch.

20. The filter apparatus as described in claim 16 including a storage tank located below said collection tank;

an interconnecting conduit between the outlet from said collection tank and an outlet from said storage tank;

a controllable valve located in said interconnecting conduit connected to said suction pump, and control means for switching said controllable valve so that liquid can be removed from either said collection tank or said storage tank.

21. The filter apparatus as described in claim 20 wherein said latter control means is said first pressure switch.

* * * * *